United States Patent
Fukushima

(10) Patent No.: US 7,002,298 B2
(45) Date of Patent: Feb. 21, 2006

(54) ULTRA-HIGH PRESSURE DISCHARGE LAMP

(75) Inventor: Kensuke Fukushima, Kakogawa (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 175 days.

(21) Appl. No.: 10/775,218

(22) Filed: Feb. 11, 2004

(65) Prior Publication Data

US 2004/0160189 A1    Aug. 19, 2004

(30) Foreign Application Priority Data

Feb. 13, 2003 (JP) .............................. 2003-034807

(51) Int. Cl.
*H01J 17/16* (2006.01)
(52) U.S. Cl. .................. 313/634; 313/493; 313/573
(58) Field of Classification Search ............... 313/634, 313/571, 639, 642, 570, 640, 493, 573, 574, 313/636; 501/54–56
See application file for complete search history.

(56) References Cited

U.S. PATENT DOCUMENTS

| 5,109,181 A | 4/1992 | Fischer et al. |
| 5,497,049 A | 3/1996 | Fischer |
| 6,940,217 B1 * | 9/2005 | Komiya et al. ............. 313/491 |
| 2002/0175624 A1 | 11/2002 | Fukushima et al. |
| 2003/0094899 A1 | 5/2003 | Fukushima et al. |

FOREIGN PATENT DOCUMENTS

JP         6-305767      11/1994

* cited by examiner

*Primary Examiner*—Edward J. Glick
*Assistant Examiner*—Elizabeth Keaney
(74) *Attorney, Agent, or Firm*—David S. Safran

(57) ABSTRACT

An ultra-high pressure discharge lamp in which the disadvantage of the reduction of the illuminance maintenance factor due to formation of blackening and milky opacification in the discharge vessel and the disadvantage of formation of cracks in the discharge vessel is eliminated by the discharge vessel being made of a silica glass that contains 0.1 ppm by weight to 290 ppm by weight hydrogen. Further advantages are obtained by the silica glass having a content of OH radicals that is at most 1 ppm by weight and a content of aluminum in a range of 2 ppm by weight to 30 ppm by weight.

4 Claims, 3 Drawing Sheets

Fig. 3

| | Hydrogen concentration (wt-ppm) | Al concentration (wt-ppm) | OH concentration (wt-ppm) | Blackening and milky opacification of arc tube | Illuminance maintenance factor | Cracks in arc tube |
|---|---|---|---|---|---|---|
| Example 1 | 1.5 | 3.1 | 0.5 | ○ | ○ | ○ |
| Example 2 | 0.6 | 6.7 | 0.5 | ○ | ○ | ○ |
| Example 3 | 2.7 | 20 | 0.6 | ○ | ○ | ○ |
| Example 4 | 5.5 | 18.2 | 0.7 | ○ | ○ | ○ |
| Example 5 | 17 | 6.5 | 0.4 | ○ | ○ | ○ |
| Example 6 | 61 | 27.1 | 0.3 | ○ | ○ | ○ |
| Example 7 | 22 | 10.2 | 0.3 | ○ | ○ | ○ |
| Example 8 | 0.1 | 7.5 | 0.5 | ○ | ○ | ○ |
| Example 9 | 35 | 19.5 | 0.5 | ○ | ○ | ○ |
| Example 10 | 0.3 | 12.6 | 0.5 | ○ | ○ | ○ |
| Example 11 | 98 | 3.7 | 0.6 | ○ | ○ | ○ |
| Example 12 | 0.38 | 4.4 | 0.5 | ○ | ○ | ○ |
| Example 13 | 77 | 2 | 0.5 | ○ | ○ | ○ |
| Example 14 | 0.2 | 20 | 0.5 | ○ | ○ | ○ |
| Example 15 | 290 | 17.8 | 0.5 | ○ | ○ | ○ |
| Example 16 | 180 | 11.6 | 0.5 | ○ | ○ | ○ |
| Example 17 | 124 | 18 | 0.9 | ○ | ○ | ○ |
| Example 18 | 52 | 30 | 0.6 | ○ | ○ | ○ |
| Example 19 | 290 | 28 | 1 | ○ | ○ | ○ |

Fig. 4

| | Hydrogen concentration (wt-ppm) | Al concentration (wt-ppm) | OH concentration (wt-ppm) | Blackening and milky opacification of arc tube | Illuminance maintenance factor | Cracks in arc tube |
|---|---|---|---|---|---|---|
| Comparative example 1 | 0.05 | 11.9 | 0.5 | ○ | ○ | × |
| Comparative example 2 | 0.08 | 13.7 | 0.5 | ○ | ○ | × |
| Comparative example 3 | 0.02 | 8.5 | 0.5 | ○ | ○ | × |
| Comparative example 4 | 320 | 14.5 | 0.5 | × | × | ○ |
| Comparative example 5 | 520 | 17.3 | 0.5 | × | × | ○ |
| Comparative example 6 | 465 | 11.8 | 0.5 | × | × | ○ |
| Comparative example 7 | 54 | 1.5 | 0.5 | ○ | ○ | × |
| Comparative example 8 | 28 | 35 | 0.5 | △ | × | ○ |
| Comparative example 9 | 2.5 | 40.5 | 0.5 | △ | △ | × |
| Comparative example 10 | 13 | 31 | 0.5 | ○ | △ | ○ |
| Comparative example 11 | 220 | 52 | 0.5 | △ | × | × |
| Comparative example 12 | 15 | 8.5 | 6 | ○ | △ | × |
| Comparative example 13 | 33 | 14.5 | 2 | ○ | △ | × |
| Comparative example 14 | 45 | 17.3 | 1.5 | ○ | △ | ○ |
| Comparative example 15 | 23 | 7.5 | 10 | △ | △ | × |

ULTRA-HIGH PRESSURE DISCHARGE LAMP

BACKGROUND OF THE INVENTION

1. Field of the Invention

The invention relates to a high pressure discharge lamp. The invention relates especially to an ultra-high pressure discharge lamp in which a discharge vessel is filled with at least 0.15 mg/mm$^3$ of mercury, and in which the mercury vapor pressure during operation is at least 150 atm.

2. Description of Related Art

In a projector device of the projection type, there is a demand for illumination of images onto a rectangular screen in a uniform manner and with adequate color rendering. Therefore, the light source is a metal halide lamp which is filled with mercury and a metal halide. Furthermore, recently smaller and smaller metal halide lamps and more and more often point light sources are being produced and lamps with extremely small distances between the electrodes are being used in practice.

Against this background, instead of metal halide lamps, lamps with an ultra-high mercury vapor pressure, for example, at least 200 bar (roughly 197 atm), have been recently proposed. Here, the broadening of the arc is suppressed by the increased mercury vapor pressure, and at the same time, a great increase of light intensity is the goal.

Recently, by application of a DLP® (Texas Instruments, digital light processor) using a DMD® (Texas Instruments, digital micro mirror device), it is no longer necessary to use a liquid crystal cell. Thus, there has been increasing attention devoted to smaller and smaller projector devices. This means that, in a discharge lamp for a projector device, on the one hand, there is a demand for a high light intensity and a high illuminance maintenance factor, and on the other hand, according to the reduction in size of the projector devices, there is a demand for smaller and smaller discharge lamps. There is also more and more often a demand for more stringent operating conditions.

In a light source device which is used for such a projector device, with respect to projection of clear images, it is considered very disadvantageous that the illuminance of the discharge lamp decreases. This reduction of the illuminance is presumably caused by the fact that the electrode material which has vaporized during lamp operation adheres to the inside wall of the discharge vessel, that in this way blackening of the discharge vessel occurs and that in this way the transmittance of the discharge vessel decreases. As a measure for elimination of the blackening of the discharge vessel, the deposition of tungsten on the inside wall of the discharge vessel is conventionally prevented using the halogen cycle by a halogen which is added to the discharge vessel (see, for example, Japanese patent disclosure documents HEI 2-148561 (U.S. Pat. No. 5,109,181) and HEI 6-52830 (U.S. Pat. No. 5,497,049), hereafter, patent specifications 1 and 2). The term "halogen cycle" is defined as a repeating process in which the metal which has been sprayed off the electrodes reacts with the halogen and oxygen which are present in the discharge vessel, that in this way a metal halide is produced and that afterwards the metal accumulates again on the electrodes.

In the installation of a discharge vessel based on the technology disclosed in the above described patent specifications 1 and 2 in a projector device and in the operation of this lamp it was, however, found that the following two disadvantages arise and that advantageously operation cannot always be carried out.

The first disadvantage is that, during the course of operation of the above described discharge lamp, blackening and milky opacification arise in the discharge vessel with the result that the illuminance maintenance factor is greatly reduced.

Here, it appears that the formation of blackening in the discharge vessel contradicts that above described circumstance. However, blackening of the discharge vessel can only be prevented when that halogen cycle is functioning to an adequate degree. It goes without saying that blackening occurs in the discharge vessel when the halogen cycle is not adequately functioning.

The second disadvantage is that cracks form in the discharge vessel when the above described discharge lamp is turned on and off relatively briefly in succession.

SUMMARY OF THE INVENTION

A primary object of the present invention is to devise an ultra-high pressure discharge lamp for a projector device in which a silica glass discharge vessel is filled with at least 0.15 mg/mm$^3$ of mercury and in which the disadvantage of the reduction of the illuminance maintenance factor due to formation of blackening and milky opacification in the discharge vessel and the disadvantage of formation of cracks in the discharge vessel can be eliminated.

In an ultra-high pressure discharge lamp in which in there is a pair of electrodes in the silica glass discharge vessel and in which this discharge vessel is filled with at least 0.15 mg/mm$^3$ of mercury, the above object is achieved by the above described silica glass containing 0.1 ppm by weight to 290 ppm by weight of hydrogen.

Furthermore, the object is advantageously achieved in accordance with the invention in a discharge lamp by the content of OH radicals being at most 1 ppm by weight and the content of aluminum being 2 ppm by weight to 30 ppm by weight.

To achieve the above described object, the inventor vigorously studied the above described first disadvantage, specifically the cause of the considerable reduction of the illuminance maintenance factor by the formation of blackening and milky opacification in the discharge vessel, and as a result has obtained the following conclusion.

First, the cause of the formation of blackening in the discharge vessel is described. Using the above described halogen cycle, the electrode material which has vaporized during lamp operation is prevented from adhering to the inside surface of the discharge vessel. However, it can be imagined that blackening forms in the discharge vessel because this halogen cycle is not adequately functioning. The reason for this is described below.

The silica glass comprising the discharge vessel has a large water content in its production step. Therefore, it contains a large amount of hydrogen and a large number of OH radicals. As a result, the hydrogen contained in the silica glass is emitted into the discharge vessel when, during operation, the temperature of the discharge vessel is increased. As a result, the halogen in the discharge vessel is captured. In this way, the vaporized electrode material and the halogen cannot combine with one another. Therefore, the electrode material adheres to the inside surface of the discharge vessel and it can be imagined that, in this way, blackening occurs in the discharge vessel.

Furthermore, it can be imagined that, by reaching a high temperature of the discharge vessel during operation, the OH radicals contained in that silica glass are decomposed by heating, so that hydrogen is produced and blackening occurs in the discharge vessel in the above described manner.

The cause of formation of milky opacification in the discharge vessel is described next. The following can be imagined:

The inside surface of the discharge vessel is reduced in the above described manner by the hydrogen emitted into the discharge vessel. The crystal nuclei which are produced thereby grow, by which milky opacification forms in the discharge vessel.

Based on this conclusion, it was found that a reduction of the contents of hydrogen and OH radicals in the silica glass is effective to eliminate the first disadvantage.

The inventor studied the above described second disadvantage, specifically the cause of formation of cracks in the discharge vessel and drew the following conclusion.

The silica glass which forms the discharge vessel contains water and thus OH radicals. Since these OH radicals in the silica glass are present in the state of Si—OH, at a high content of OH radicals, a plurality of non-crosslinking bonds is thus formed so that the $SiO_2$ network structure is interrupted. When the discharge vessel reaches a high temperature during lamp operation, these non-crosslinking bonds move freely in the network structure, by which the viscosity of the silica glass decreases. It can be imagined that, in this way, the heat resistance of the silica glass is reduced and that this causes cracks to form in the discharge vessel. In the discharge lamp of the invention, the discharge vessel reaches a very high temperature during operation. It can be imagined that the discharge vessel of silica glass which contains a large number of OH radicals, therefore, has insufficient heat resistance.

Based on this conclusion, it was found that a reduction of the content of OH radicals in the silica glass is effective to eliminate the second disadvantage.

Furthermore, the inventor found that the motion of the non-crosslinking bonds in the discharge vessel with high temperature can be suppressed if a suitable amount of aluminum is added to the discharge vessel, either by modification of the above described non-crosslinking bonds or by the formation of a pinning site with formation of an Al—O bond.

This means that the second disadvantage can also be effectively eliminated by fixing the aluminum content in the discharge vessel to a suitable range.

The invention is further described with reference to the accompanying drawings.

BRIEF DESCRIPTION OF THE DRAWINGS

FIG. 3 is a table showing the action of ultra-high pressure discharge lamps in accordance with the invention; and FIG. 4 is a table showing the action of comparative examples.

DETAILED DESCRIPTION OF THE INVENTION

Figure 1:
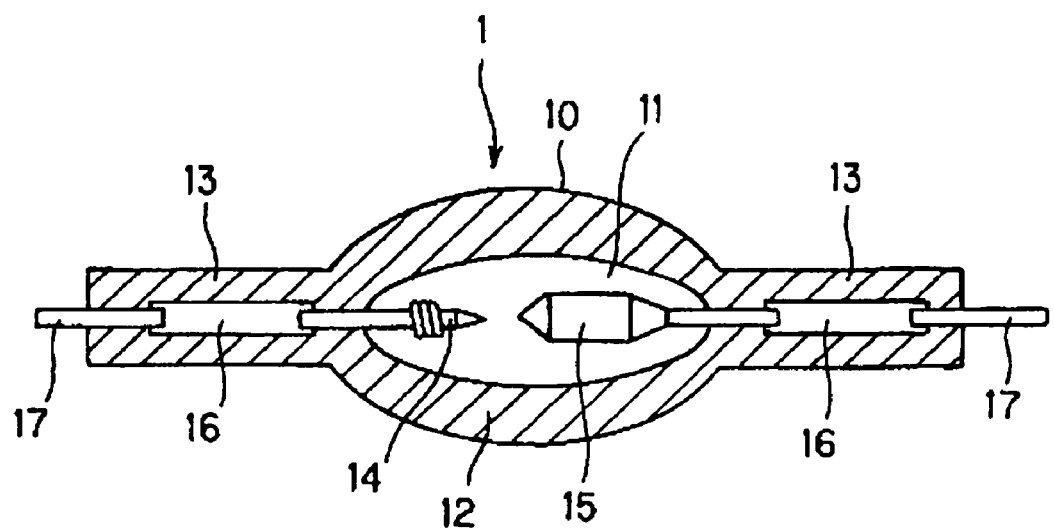
FIG. 1 is a schematic cross-sectional view of an ultra-high pressure discharge lamp in accordance with the invention.

FIG. 1 shows the ultra-high pressure discharge lamp of the invention (also called a discharge lamp) in a cross section which is cut in the longitudinal direction of the tube axis. In the figure, a discharge lamp I has a silica glass discharge vessel 10 which has an arc tube part 12 which surrounds a discharge space 11, and hermetically sealed portions 13 which are formed at opposite ends of the arc tube part 12. The opposed electrodes in the discharge space 11 comprise a cathode 14 and an anode 15, which are made of tungsten. In each of the hermetically sealed portions 13, a respective molybdenum metal foil 16 is hermetically sealed, for example, by a pinch seal or shrink seal. The base of the cathode 14 and of the anode 15 is electrically connected to an end of the metal foil 16 on the side of the arc tube part. An outer lead pin 17 projects outward from each sealed portion and is electrically connected by welding to the other end of the respective metal foil 16. A conventional discharge lamp also has the same arrangement as FIG. 1; this relates only to the physical configuration itself.

The discharge space 11 is filled with mercury, a rare gas and a halogen gas. The amount of mercury is at least 0.15 $mg/mm^3$ in order to obtain radiant light with wavelengths in the visible range. This added amount of mercury is a value which has been determined in such a way that the mercury vapor pressure within the arc tube part 12 reaches at least 150 atm during operation. As the rare gas, for example, 13.3 kPa of Ar is added. As the halogen gas, for example, $2\times10^{-4}$ $\mu mole/mm^3$ of bromine is added in order to prolong the service life of the discharge lamp by carrying out the halogen cycle.

The numerical values of such a discharge lamp are shown below by way of example:

maximum outside diameter of the arc tube part: 11 mm
outside diameter of the hermetically sealed portion: 5 mm
distance between the electrodes: 1.2 mm
inside volume of the arc tube: 100 $mm^3$
rated voltage: 75 V
rated wattage: 200 W.

The discharge lamp 1 of the invention contains hydrogen in the silica glass of the discharge vessel 10 that is fixed in the range from 0.1 ppm by weight to 290 ppm by weight. The reasons for fixing the content of the hydrogen in this range are described below.

If the content of hydrogen exceeds 290 ppm by weight, during operation, a large amount of halogen is captured by the hydrogen emitted from the silica glass into the discharge space 11. The amount of halogen which combines with the vaporized electrode material, i.e., with tungsten, is therefore reduced. As a result, the halogen cycle cannot function adequately. Therefore, tungsten adheres to the inside surface of the arc tube part 12, and blackening occurs in the arc tube part 12.

Furthermore, during lamp operation, the inside surface of the arc tube part 12 is reduced by the hydrogen which is emitted from the silica glass into the discharge space 11. The crystal nuclei which are produced grow, by which milky opacification occurs in the arc tube part 12.

For the above described reasons the illuminance maintenance factor of the discharge lamp 1 is reduced.

If the content of hydrogen is less than 0.1 ppm by weight, in the arc tube part 12 neither blackening nor milky opacification occur. Because the hydrogen in the silica glass disappear to an excess degree, a structural fault however occurs. In this way the mechanical strength of the discharge vessel is reduced, and cracks form in the arc tube part 12.

In order to fix the content of hydrogen in the silica glass in the range from 0.1 ppm by weight to 290 ppm by weight, it is necessary to subject the silica glass tube from which the discharge vessel 10 is to be formed to vacuum degassing and to reduce the amount of water which the silica glass tube contains.

As specific treatment conditions, for example, the treatment temperature is 1150° C., the treatment pressure is $10^{-4}$ Pa and the treatment time is 17 hours.

Figure 2:
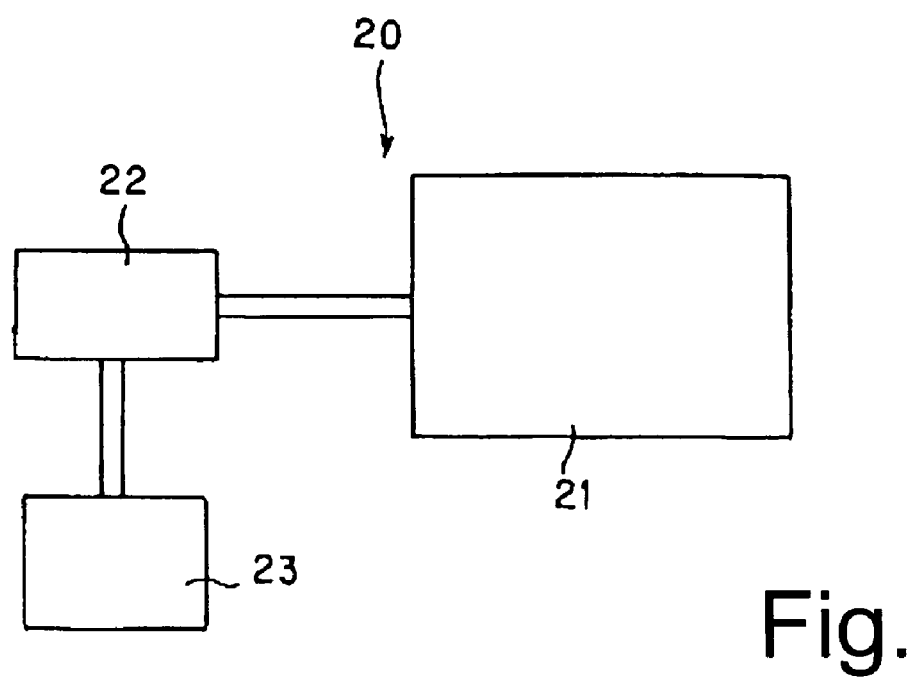
FIG. 2 is a block diagram of important parts of a hydrogen gas analyzer for measuring the content of hydrogen in the silica glass.

FIG. 2 shows important parts of a hydrogen gas analyzer 20 for measuring the content of hydrogen in a silica glass tube. The hydrogen gas analyzer 20 has a heating furnace 21 for heating the samples, a thermal conductivity detector 22 and a measuring device 23 which computes the amount of hydrogen based on the amount of change of the thermal conductivity.

First, helium as the carrier gas is fed into the thermal conductivity detector 22 and the thermal conductivity is measured. The measured value which is obtained is called the first measured value. Next a sample powder M which has been obtained by grinding of silica glass tube, and iron as well as tin as auxiliary burning materials are burned at the same time in the heating furnace 21. The resulting gas is fed into the thermal conductivity detector 22 and the thermal conductivity is measured. The resulting measured value is called the second measured value. The measured values are compared in the measurement device 23 and in this way the amount of hydrogen contained in the sample powder M can be determined.

The discharge lamp 1 of the invention is characterized in that the content of the hydrogen in the silica glass is fixed in the above described manner, that, moreover, the content of OH radicals is fixed at less than or equal to 1 ppm by weight and that the content of aluminum is fixed in the range from 2 ppm by weight to 30 ppm by weight.

First, the reason for fixing the content of OH radicals is described. When the content of OH radicals exceeds 1 ppm by weight, due to the thermal decomposition of the OH radicals, a large amount of hydrogen is emitted into the discharge space 11, by which blackening and milky opacification form in the arc tube part 12. This reduces the illuminance maintenance factor of the discharge lamp 1.

If the content of OH radicals exceeds 1 ppm by weight, a plurality of non-crosslinking bonds are formed so that the $SiO_2$ network structure is interrupted. When the discharge vessel reaches a high temperature during lamp operation, these non-crosslinking bonds move freely in the network structure, by which the viscosity of the silica glass decreases. In this way, the heat resistance of the silica glass is reduced and cracks form in the arc tube part 12.

Furthermore, by vacuum degassing of the silica glass tube which is designed to form the discharge vessel 10, under the above described treatment conditions, the content of OH radicals in the silica glass can be fixed at less than or equal to 1 ppm by weight.

The reason why the silica glass contains aluminum and why the its content is fixed is described next. Because the silica glass contains a suitable amount of aluminum, either by modification of the above described non-crosslinking bonds or by formation of pinning sites with formation of an Al—O bond the motion of the non-crosslinking bonds when a high temperature of the discharge vessel is reached can be suppressed.

If the content of aluminum exceeds 30 ppm by weight, the effect of impurities becomes great, by which in the arc tube part 12 milky opacification and moreover also cracks form. When the content of aluminum is less than 2 ppm by weight, neither the function of modification of the non-crosslinking bonds nor the function of suppressing the motion of the non-crosslinking bonds to a sufficient degree is possible. This reduces the viscosity of the silica glass. As a result, the heat resistance of the silica glass decreases and cracks form in the arc tube part 12.

Here, ultra-high pressure discharge lamps which were produced for carrying out a test with respect to the action and the effect of the invention are described.

(Embodiments)

The hydrogen concentration in the silica glass, the concentration of OH radicals and the aluminum concentration is fixed within the range of numerical values of the invention. Nineteen ultra-high pressure discharge lamps with the arrangement shown in FIG. 1 were produced using the following specification.

(Ultra-high Pressure Discharge Lamp)
maximum outside diameter of the arc tube part: 11 mm
inside volume of the arc tube: 100 $mm^3$
distance between the electrodes: 1.2 mm
amount of added mercury: 0.25 $mg/mm^3$
added halogen gas: bromine
amount of added halogen: $1.3 \times 10^{-8}$ mole
rated voltage: 70 V
rated current: 3 A

COMPARISON EXAMPLES

The hydrogen concentration in the silica glass, the concentration of OH radicals and the aluminum concentration were fixed outside the ranges of the numerical values of the invention, and 15 ultra-high pressure discharge lamps with the arrangement shown in FIG. 1 were produced using the same specification as in the embodiments.

A test using the ultra-high pressure discharge lamps according to the above described embodiments and using the ultra-high pressure discharge lamps according to the above described comparison examples is described below.

In the test, in the ultra-high pressure discharge lamps according to the embodiments and the comparison examples, with respect to blackening and milky opacification of the arc tube part 12, changes of the illuminance maintenance factor and crack formation in the arc tube part 12 were observed.

With respect to the blackening and milky opacification of the arc tube part 12, operation was repeated 50 times, in which there were two minutes ON and then 40 seconds OFF, and afterwards the discharge vessel was visually checked and examined for blackening and milky opacification.

With respect to changes of the illuminance maintenance factor 50 hours of uninterrupted operation were carried out and afterwards changes of the illuminance maintenance factor were observed.

With respect to crack formation of the arc tube part 12, operation was repeated 50 times, in which there were two minutes ON and then 40 seconds OFF, and afterwards the discharge vessel was checked visually and for crack formation.

FIG. 3 shows the experimental results for the ultra-high pressure discharge lamps according to the above described embodiments (embodiments 1 to 19). With respect to blackening and milky opacification there are cases in which neither blackening nor milky opacification occurred, labelled "o", cases in which only milky opacification occurred, labelled "Δ", and cases in which both blackening and also milky opacification formed, labelled "X". With respect to changes of the illuminance maintenance factor there are cases in which the illuminance maintenance factor is at least 98%, labelled "o", cases in which the illuminance maintenance factor is 80% to 98%, labelled "Δ", and cases in which the illuminance maintenance factor is at most 80%, labelled "X".

With respect to crack formation, there are cases in which no cracks occurred, labelled "o", and cases in which cracks did form, labelled "X".

It becomes apparent from the results shown in FIG. 3 that neither blackening nor milky opacification occur in the arc tube part 12, that the illuminance maintenance factor does not decrease, and furthermore, no cracks form in the arc tube part 12 when the hydrogen concentration is in the range from 0.1 ppm by weight to 290 ppm by weight, the aluminum concentration is in the range from 2 ppm by weight to 30 ppm by weight, and when the concentration of OH radicals is in the range of less than or equal to 1 ppm by weight.

FIG. 4 shows the experimental results for the ultra-high pressure discharge lamps according to the above described comparison examples (comparison examples 1 to 15). The comparison examples 1 to 6 relate to the results of the test which was carried out in the case in which the concentration of OH radicals and the aluminum concentration are within the ranges of the invention and the hydrogen concentration is outside the range of the invention.

In FIG. 4, cracks form in the arc tube part 12 when the hydrogen concentration is less than 0.1 ppm by weight. If it exceeds 290 ppm by weight, both blackening and milky opacification occur in the arc tube part 12 and the illuminance maintenance factor also drops to less than or equal to 80%.

The comparison examples 7 to 11 relate to the results of the test which was carried out in the case in which the concentration of OH radicals and the hydrogen concentration are within the ranges of the invention and the aluminum concentration is outside the range of the invention.

In FIG. 4, cracks form in the arc tube part 12 when the aluminum concentration is less than 2 ppm by weight. If it exceeds 30 ppm by weight, the illuminance maintenance factor also decreased in comparison example 10 which best approached the 30 ppm by weight. In comparison example 11 with the greatest aluminum concentration, milky opacification and moreover cracks occurred in the arc tube part 12, by which the illuminance maintenance factor decreased greatly.

The comparison examples 12 to 15 relate to the result of the test which was carried out in the case in which the hydrogen concentration and the aluminum concentration are within the ranges of the invention and the concentration of OH radicals is outside the range of the invention.

In FIG. 4, also in comparison example 14 which best approached 1 ppm by weight, the illuminance maintenance factor decreased when the concentration of OH radicals exceeds 1 ppm by weight. In the comparison example 15 with the greatest concentration of OH radicals, milky opacification and moreover cracks occurred in the arc tube part 12, by which the illuminance maintenance factor decreased.

Fixing the hydrogen concentration of the silica glass, the concentration of OH radicals and the aluminum concentration in accordance with the invention relates normally to fixing for the arc tube part 12. However fixing can also be carried out for the entire discharge vessel 10 including the hermetically sealed portions 13.

Action of the Invention

As was described above, in accordance with the invention, an ultra-high pressure discharge lamp can be devised in which the disadvantage of the reduction of the illuminance maintenance factor by the formation of blackening and milky opacification in the discharge vessel and the disadvantage of formation of cracks in the discharge vessel can be eliminated.

What is claimed is:

1. Ultra-high pressure discharge lamp, comprising:
   a discharge vessel made of silica glass which is filled at least 0.15 mg/mm$^3$ of mercury, and which contains a pair of opposed electrodes,
   wherein the silica glass contains 0.1 ppm by weight to 290 ppm by weight of hydrogen.

2. Ultra-high pressure discharge lamp as claimed in claim 1, wherein in the silica glass has a content of OH radicals that is at most 1 ppm by weight and a content of aluminum in a range of 2 ppm by weight to 30 ppm by weight.

3. Ultra-high pressure discharge lamp as claimed in claim 1, wherein the silica glass is a vacuum degassed silica glass.

4. Ultra-high pressure discharge lamp as claimed in claim 3, wherein vacuum degassed silica glass has been degassed for several hours at an elevated temperature.

* * * * *